United States Patent
Han

(10) Patent No.: US 8,253,956 B2
(45) Date of Patent: Aug. 28, 2012

(54) METHOD OF NOTIFYING PRINT JOB INFORMATION AND PRINTER AND PRINTING SYSTEM USING THE SAME

(75) Inventor: Ho-Sung Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1161 days.

(21) Appl. No.: 11/453,148

(22) Filed: Jun. 15, 2006

(65) Prior Publication Data
US 2007/0008581 A1 Jan. 11, 2007

(30) Foreign Application Priority Data
Jul. 5, 2005 (KR) .................. 10-2005-0060479

(51) Int. Cl.
*G06F 3/12* (2006.01)
(52) U.S. Cl. ............................... 358/1.15; 358/1.13
(58) Field of Classification Search .............. None
See application file for complete search history.

(56) References Cited

U.S. PATENT DOCUMENTS

| 6,903,834 B1* | 6/2005 | Mori | 358/1.15 |
| 2004/0032619 A1* | 2/2004 | Izaki | 358/1.16 |
| 2005/0010928 A1* | 1/2005 | Gunji | 719/318 |
| 2006/0092433 A1* | 5/2006 | Stevens et al. | 358/1.1 |

FOREIGN PATENT DOCUMENTS

| JP | 2001-256147 | 9/2001 |
| KR | 1020010016803 | 3/2001 |
| KR | 1020010026434 | 3/2001 |

* cited by examiner

*Primary Examiner* — Twyler Haskins
*Assistant Examiner* — Marcus T Riley
(74) *Attorney, Agent, or Firm* — Roylance, Abrams, Berdo & Goodman, LLP

(57) ABSTRACT

A method of notifying a print job to safely and conveniently share the print job, a printer and a printing system using the same are provided. The print job information notifying system includes a printer driver transmitting a print job and a designated use information, a print job information storage unit receiving the print job and the designated user information from the printer driver and storing the same, and a print job management unit notifying the designated user that the print job is stored according to contact information if the designated user information includes the contact information of the designated user.

20 Claims, 4 Drawing Sheets

METHOD OF NOTIFYING PRINT JOB INFORMATION AND PRINTER AND PRINTING SYSTEM USING THE SAME

CROSS-REFERENCE TO RELATED APPLICATIONS

This application claims the benefit under 35 U.S.C. §119 (a) from Korean Patent Application No. 2005-60479, filed in the Korean Intellectual Property Office on Jul. 5, 2005, the entire disclosure of which is hereby incorporated by reference.

BACKGROUND OF THE INVENTION

1. Field of the Invention

The present invention relates to a method for notifying print job information, a printer and a printing system using the same. More particularly, the present invention relates to a method for notifying print job information to share a print job conveniently and safely, a printer and a printing system using the same.

2. Description of the Related Art

A printer comprises a storage device with a high capacity to store a large amount of print jobs and allows a plurality of users to share the print jobs stored in the storage device.

In order to share a print job stored in the storage device with another user, a user must notify another user that the print job is stored in the printer. For example, a user who stores a print job in a printer will verbally notify another user that the print job is stored in the printer. Then, the notified user has to search the print job using a user interface such as a control panel. The user interface allows a user to see the print jobs stored in the storage device. Therefore, the conventional print job notification procedure causes inconvenience to the user who shares his/her stored print job and to the user who is notified. Also, if a print job is to be secured, the print job is typically encrypted with a password. However, since the password is verbally notified according to the conventional notification procedure, the user is likely to forget the password as time lapses.

Accordingly, there is a need for an improved system and method for providing a user with notifying print job information and for sharing a print job conveniently and safely.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention has been developed in order to solve the problems in the related art. Accordingly, an aspect of exemplary embodiments of the present invention is to provide a method for notifying print job information to share a print job conveniently and safely and to provide a printer and a printing system using the same.

According to an exemplary embodiment of the present invention, a print job information notifying system includes a printer driver that transmits a print job and designated user information. A print job information storage unit receives the print job and the designated user information from the printer driver and stores the print job. If the designated user information includes contact information of a designated user, a print job management unit notifies the designated user that the print job is stored according to the contact information.

Preferably, but not necessarily, the print job information notifying system further includes an account information storage unit that stores a list of user names of the system and contact information corresponding to user names If the designated user information includes a designated user name, the print job management unit reads out contact information corresponding to the designated user name from the stored list and notifies the designated user that the print job is stored according to the read contact information.

Preferably, the printer driver reads out contact information corresponding to a designated user name from the stored list, adds the read contact information to the designated user information and transmits the designated user information.

According to one aspect of an exemplary embodiment of the present invention, the designated user name is either in a public mode or a private mode. The public mode designates all of the users and the private mode designates at least one of the users.

If the designated user name is in the private mode, the print job is encrypted, the print job information storage unit receives a password from the printer driver, and the print job management unit transmits the received password to the designated user according to the contact information.

Preferably, the print job information storage unit receives a new designated user name from the printer driver and thereby updates the pre-stored designated user name. The print job management unit reads out contact information corresponding to the updated designated user name from the account information storage unit and notifies the updated designated user that the print job is stored according to the read contact information.

According to an exemplary embodiment of the present invention, a print job information notifying printer includes a print job information storage unit that receives a print job and a designated user name from a source user. The print job information notifying printer also includes a print job information storage par that stores the print job and the designated user name, an account information storage unit that stores user names and contact information corresponding to the user names, and a print job management unit that reads out contact information corresponding to the designated user name from the account information storage unit and notifies the designated user that the print job is stored according to the read contact information.

Preferably, the designated user name is either in a public mode or a private mode. The public mode designates all of the users and the private mode designates at last one of the users.

Preferably, but not necessarily, if the designated user name is in the private mode, the print job is encrypted by the source user, the print job information storage unit receives a password from the source user, and the print job management unit transmits the received password to the designated user according to the contact information.

Preferably, but not necessarily, the print job information storage unit receives a new designated user name from the source user and updates the pre-stored designated user name, and the print job management unit reads out a contact information corresponding to the updated designated user from the account information storage unit and notifies the updated designated user that the print job is stored according to the read contact information.

According to an exemplary embodiment of the present invention, a method for notifying print job information includes receiving a print job from a printer driver and designated user information from a source user and storing the print job and the designated user information. If the designated user information includes contact information of a designated user, the designated user is notified by the printer that the print job is stored according to the contact information.

Preferably, but not necessarily, the method further includes storing a list that contains user names of the printer and contact information corresponding to the user names. The method also further includes the printer reading out contact information corresponding to the designated user name from the stored list and notifying the designated user that the print job is stored according to the read contact information if the designated user information includes a designated user name.

Preferably, but not necessarily, the designated user name is in a public mode or a private mode. The public mode designates all of the users and the private mode designates at least one of the users.

Preferably, but not necessarily, if the designated user name is in the private mode, the print job is encrypted. More specifically, the printer receives a password and transmits the received password to the designated user according to the account information.

Preferably, but not necessarily, the method further includes receiving a new designated user name from the source user by the printer and thereby updating the pre-stored designated user name, and reading out a contact information corresponding to the updated designated user name from the list by the printer and notifying the updated designated user that the print job is stored according to the read contact information.

Preferably, but not necessarily, the contact information is one of an e-mail address, a network address, and a mobile terminal number, and the notification is performed via one of an email, a SMS, a messenger and a monitor of the designated user having a network address.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

This and/or other aspects of exemplary embodiments of the present invention will become apparent and more readily appreciated from the following description of the embodiments, taken in conjunction with the accompanying drawings of which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
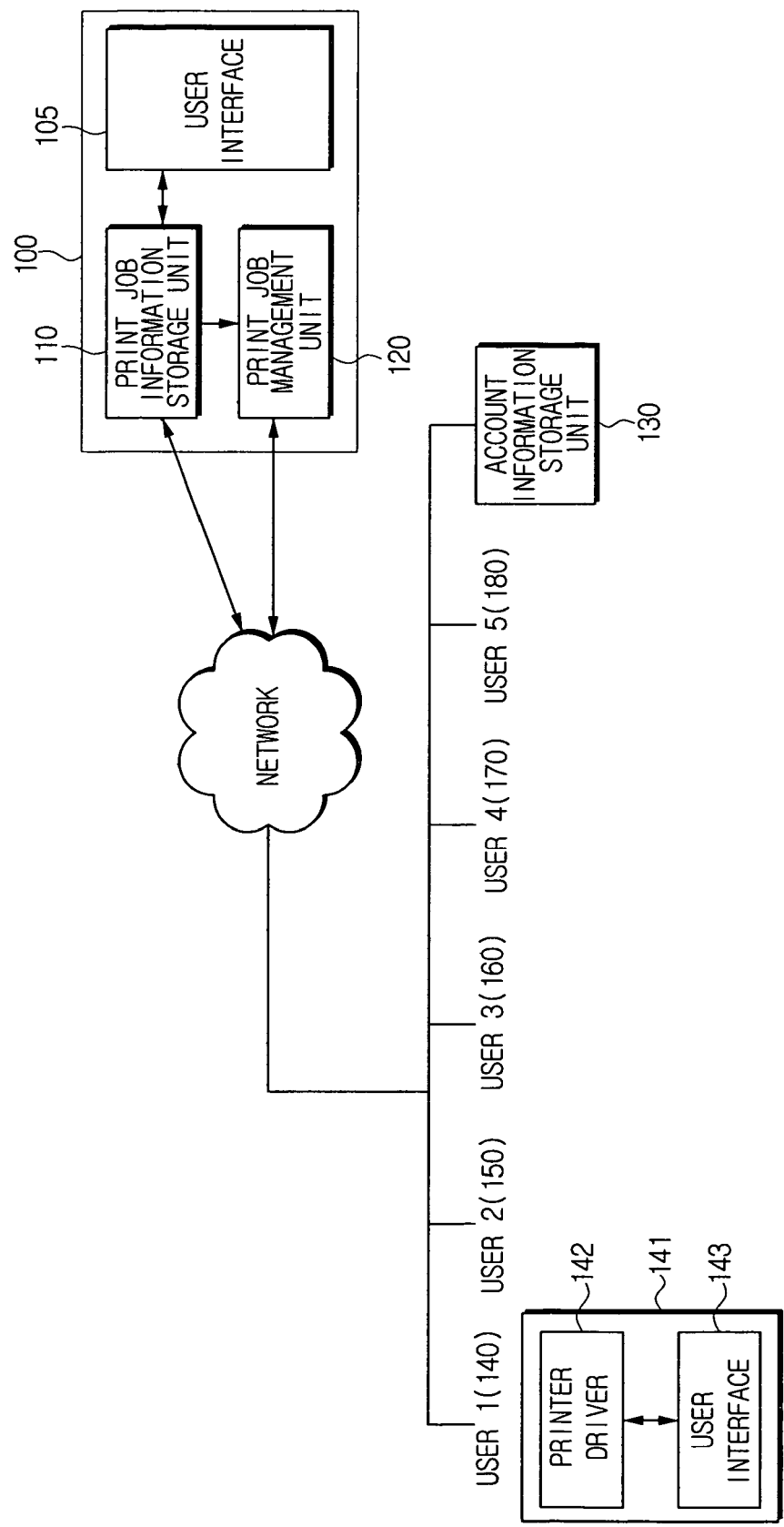
FIG. 1 is a view illustrating a printing system according to an exemplary embodiment of the present invention.

FIG. 1 is a view illustrating a printing system according to an exemplary embodiment of the present invention. The printing system comprises a host 141 and an image forming apparatus 100 (referred to as "printer" hereinafter). Preferably, the printing system further comprises an account information storage unit 130.

The host 141 comprises a printer driver 142 and a user interface 143.

The printer driver 142 transmits a print job and information about a designated user to the printer 100. For example, the printer driver 142 is provided in the host 141 of a USER 1 connected to the printer 100.

The print job is data to be printed and is written in a language such as a printer description language (PDL) that is comprehensible by the printer 100. Preferably, the print job is written in the PDL, whereas the print job information is written in a printer job language (PJL). However, the information such as paper size may be written in the PDL.

The term 'source user' used throughout the specification of the present application means a user that stores a print job in the printer 100 and allows another user to access the stored print job. The 'designated user' means a user that is designated by the source user for accessibility to the stored print job.

The source user determines the designated user with designated user information. The designated user information includes contact information. The printer 100 notifies the designated user that the print job is stored in the printer 100 based on the contact information. The contact information may be an e-mail address, a network address, or a mobile terminal number to transmit a short message service (SMS).

If there is no account information storage unit 130 in the printing system, the printer driver 142 directly receives the contact information of the designated user and contacts the corresponding designated user to notify that the print job is stored in the printer 100.

Preferably, the designated user information may include a designated user name. For this, the printing system may include the account information storage unit 130. The account information storage unit 130 stores a list that contains user names of the printing system and contact information corresponding to the user names. The account information storage unit 130 may be located independently as shown in FIG. 1, may be included in the printer 100, or may be included in hosts of the respective users.

The respective users 140, 150, 160, 170, and 180 store their own names and corresponding contact information in the account information storage unit 130 through user interfaces of their respective hosts or the user interface of the printer 100. If the printer driver 142 transmits the designated user name other than the contact information, a print job management unit 120, which will be described below, reads out the contact information corresponding to the designated user name from the account information storage unit 130, and contacts the corresponding designated user for notification. According to another embodiment, if the account information storage unit 130 is included, the printer driver 142 directly reads out the contact information corresponding to the designated user name from the account information storage unit 130, adds the read-out contact information to the designated user information and transmits the designated user information along with the print job. If the account information storage unit 130 is provided in the host 141, it is easy to read out the contact information and to add the contact information to the designated user information.

The designated user may indicate some of the users existing in the printing system. For example, the number of the designated user is 1 or 2, and the designated user may indicate all of the users existing in the printing system. The source user notifies another user of the stored print job but may not notify the source user itself. In this case, the source user is not a designated user. The source user may be included with the designated user. Alternatively, the source user is set such that the source user is always included in the designated user.

The designated user name is either in a public mode or a private mode. If the designated user name is in the public mode, all of the users belonging to the printing system are notified that the print job is stored. If the designated user name is in the private mode, some of users are notified that the print job is stored.

If the designated user name is in the private mode, it identifies the respective users such as 'USER1', 'USER2', 'USER3', 'USER4', and/or 'USER5'. If the designated user name is in the public mode, it indicates all of users. For example, if the designated user name is 'PUBLIC', the contact information of all of the users is read out from the account information storage unit 130.

If the designated user name is in the private mode, the print job is protected by password encryption. For this, the printer driver 142 transmits the password together with the print job and the designated user information. Accordingly, a user who does not know the password is not able to open and perform the print job. The encryption is performed by setting the password with respect to a file of an application or by setting a password in the printer driver 142.

The user interface 143 of the host 141 receives the print job, the designated user information and/or the password and transmits them to the printer driver 142, and also receives the print job stored in the printer 100 through the printer driver 142 and displays it.

The printer 100 comprises a print job information storage unit 110, the print job management unit 120 and a user interface 105.

The print job information storage unit 110 receives the print job, the designated user information and/or the password from the printer driver 142 and stores this information. At this time, the print job is converted into bitmap-like data that is printable by the printer 100, compressed and stored. For this, the printer 100 comprises a mass storage device.

If the designated user information includes the designated user name, the print job management unit 120 reads out contact information corresponding to the designated user name from the account information storage unit 130, and notifies the designated user that the print job is stored according to the read contact information. If the designated user information includes the contact information of the designated user, the print job management unit 120 directly contacts the designated user and notifies the designated user that the print job is stored. If the print job management unit 120 receives the password together with the designated user information, it also notifies the designated user of the password.

If the designated user name is in the public mode, the print job management unit 120 notifies all of the users stored in the account information storage unit 130 that the print job is stored in the printer 100.

Figure 3:
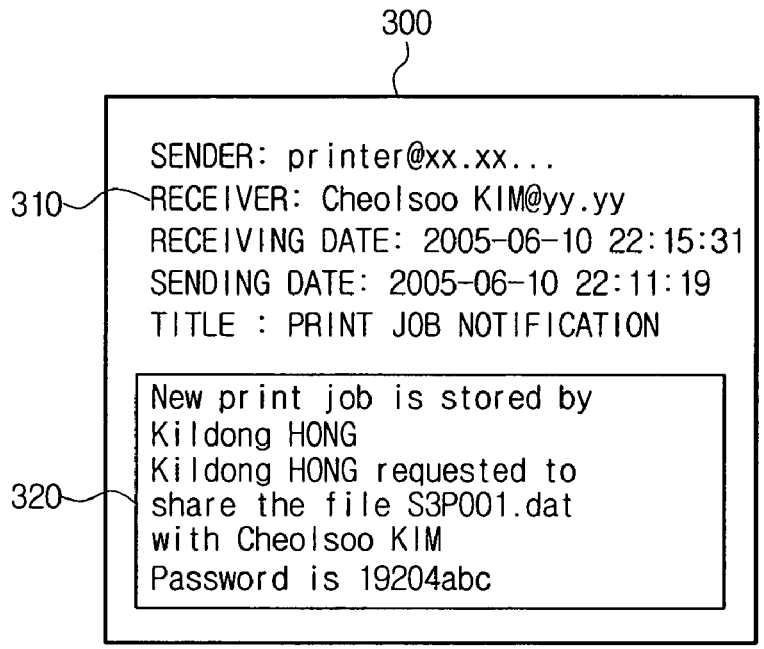
FIG. 3 is a view illustrating one example of an E-mail to notify print job information according to an exemplary embodiment of the present invention.

FIG. 3 is a view illustrating one example of an e-mail 300 to notify of a print job according to an exemplary embodiment of the present invention.

Referring to FIG. 3, the print job management unit 120 transmits a message 320 indicating that the printer 100 stores a print job to a designated user 310 via e-mail. If the designated user name is in the private mode, a password is transmitted together with the message 320. Alternatively, the print job management unit 120 notifies that the print job is stored via a short message service (SMS) or a messenger. Due to the use of e-mail, SMS or messenger, it is more convenient for the source user to notify and the designated user to be notified.

The print job management unit 120 notifies that the print job is stored via a display device (not shown) provided in a host of the designated user having a network address such as IP address at the same time. The display device of the designated user includes a monitor.

The user interface 105 of the printer 100 reads out the print job stored in the print job information storage unit 110 and displays it such that the designated user is notified of the print job via e-mail, SMS or messenger accesses the print job. This function may be performed by the user interface 143 of the host 141.

Figure 4:
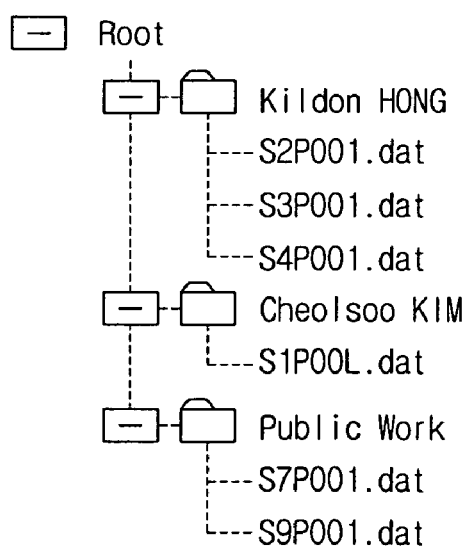
FIG. 4 is a view illustrating print jobs stored in the printer according to an exemplary embodiment of the present invention.

FIG. 4 is a view illustrating one example of print jobs stored in the printer 100 according to an exemplary embodiment of the present invention. As shown in FIG. 4, if a print job is designated as a private mode by the user 'Kildong HONG' or 'Cheolsoo KIM', it is displayed in the folder named 'Kildong HONG' or 'Cheolsoo KIM'. Meanwhile, a print job is designated as a public mode, it is displayed in the folder named 'Public Work'. If the designated user is notified via e-mail as shown in FIG. 3, the designated user clicks a file as being notified to perform a printing operation. If the designated user name is in the private mode, the designated user must input a notified password to access the file.

For example, it is assumed that the source user 'USER1' 140 intends to share the data 'S2P001.dat', 'S3P001.dat', and 'S4P001.dat' with the designated users 'USER3' 160 and the 'USER4' 170. The designated user name is in the private mode. The print job management unit 120 transmits to the 'USER3' 160 and the 'USER4' 170 a message via e-mail as shown in FIG. 3. Upon receiving the e-mail, the 'USER3' 160 selects the file 'S3P001.dat' of the files displayed on the user interface 143, 105 as shown in FIG. 4 and inputs a password, thereby accessing the file 'S3P001.dat'.

The print job information storage unit 110 of FIG. 1 receives a new designated user name from the printer driver 142 and thereby updates the pre-stored designated user name. In this case, the designated user name is changed from the private mode to the public mode or vice versa. If the designated user name is in the private mode, it is possible that the mode is maintained and only the designated user is changed. Preferably, this updating procedure can be performed only by the source user. According to another embodiment, the source user is stored in the print job information storage unit 110 together with the print job such that only the source user is authorized to change the designated user name.

The print job management unit 120 reads out contact information corresponding to the updated designated user name from the account information storage unit 130, and notifies the new designated user that the print job is stored according to the read contact information. At this time, the print job management unit 120 may notify the previous designated user that the previous designated user has no accessibility with respect to the stored print job.

Figure 2:
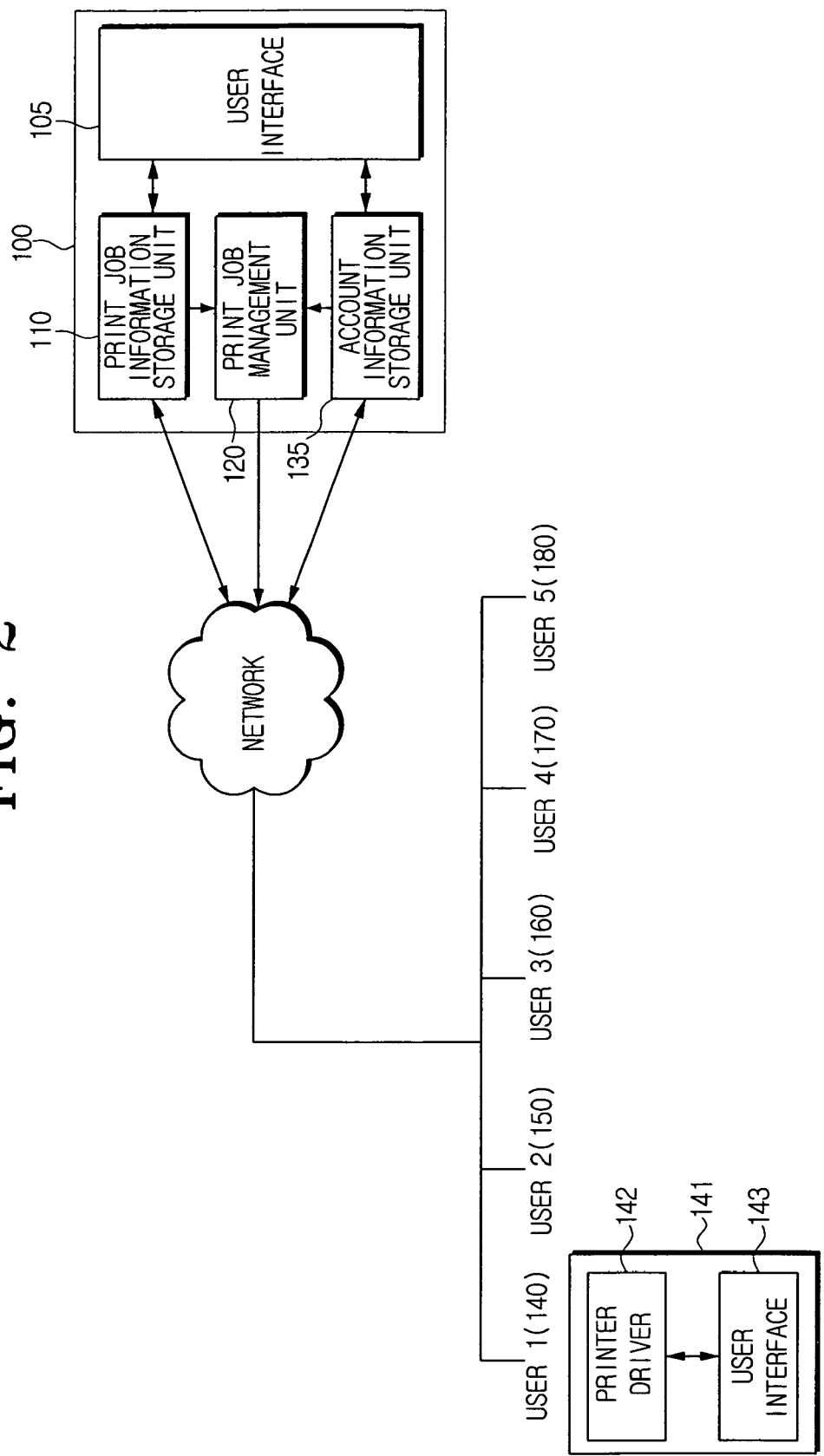
FIG. 2 is a view illustrating printer according to an exemplary embodiment of the present invention.

FIG. 2 is a view illustrating a printer according to an exemplary embodiment of the present invention. The list containing the user names and the contact information corresponding to the user names as described above is stored in an account information storage unit 135 provided in the printer 100 as shown in FIG. 2. Accordingly, the mass storage device of the printer 100 can be used effectively. Since the print job management unit 120 reads out the contact information corresponding to the designated user name from the account information storage unit 135 provided in the printer 100 without accessing the account information storage unit 130 networked with the printer 100, the notification is performed rapidly.

The print job information storage unit 110 receives a print job and a designated user name from the source user. At this time, the source user may be the printer driver 142 of the host 141 or the interface 105 of the printer 100.

Figure 5:
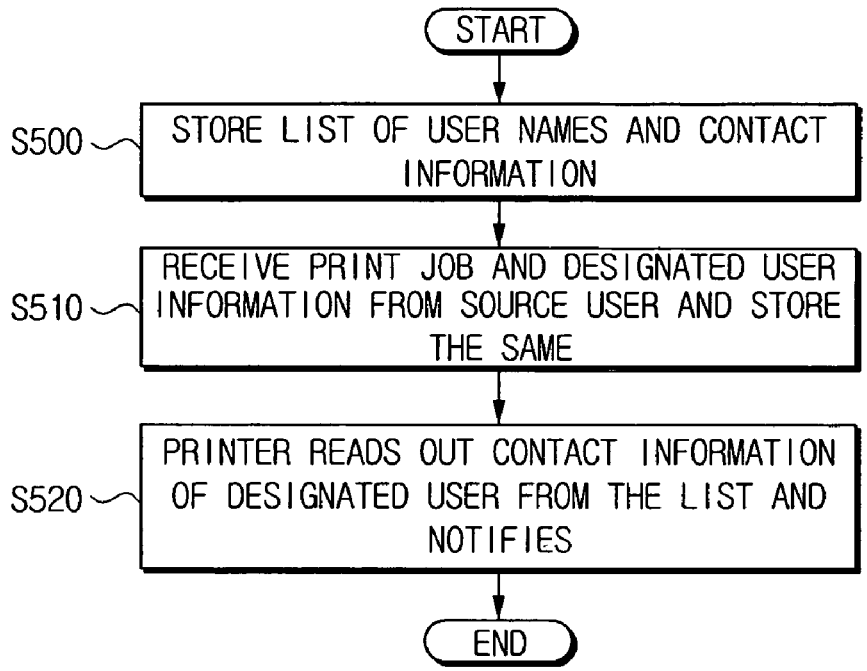
FIG. 5 is a flowchart illustrating a process of notifying print job information according to an exemplary embodiment of the present invention.

FIG. 5 is a flowchart illustrating a method for notifying print job information according to an exemplary embodiment of the present invention.

At operation S500, a list containing user names of the printer 100 and contact information corresponding to the user names are stored. The list may be stored in the account information storage unit 130 located on a network or the account information storage unit 135 provided in the printer 100. The user names distinguish respective users, and for example, may be unique user IDs. The contact information indicates the user notified about the print job and includes an e-mail address, a network address or a mobile terminal number capable of receiving a SMS message.

At operation S510, the printer 100 receives a print job and designated user information from a source user and stores the same. A designated user name is either in the public mode for designating all of users or the private mode for designating at least one user. If the designated user name is in the private mode, the printer 100 receives a password to protect the received print job. For this, the printer 100 receives the password together with the print job and the designated user information and the print job is encrypted with the password.

At operation S520, if the designated user information includes the designated user name, the printer 100 reads out contact information corresponding to the designated user name from the list stored at operation S500, and notifies the designated user that the print job is stored according to the read contact information. If the designated user name is in the private mode, the printer 100 receives the password at operation S510 and notifies the designated user about the password. If the designated user name is in the public mode, all of the users stored at operation S500 are notified that the print job is stored.

If the designated user information includes the contact information of the designated user, the printer 300 directly contacts the designated user and notifies the user that the print job is stored.

The notification is transmitted via an e-mail as shown in FIG. 3. For example, since the printer 300 notifies about the print job via e-mail, SMS or messenger, it is more convenient for the source user to notify of the print job and also convenient for the designated user to be notified. Also, when the notification is transmitted via e-mail, it instantly appears in the display device of the host of the designated user having a network address such as IP address. The display device of the designated user includes a monitor.

Figure 6:
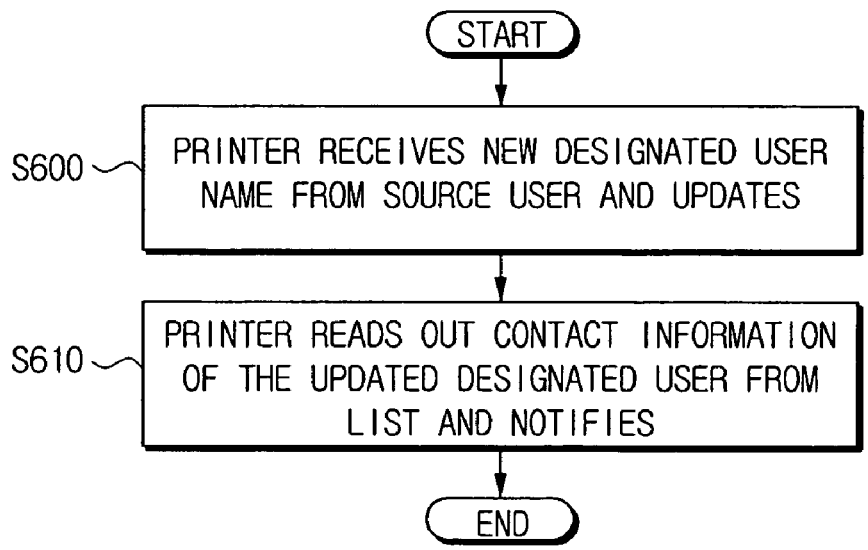
FIG. 6 is a flowchart illustrating a process of updating the notification of print job information according to an exemplary embodiment of the present invention.

FIG. 6 is a flowchart illustrating a process of updating the notification of the print job according to an exemplary embodiment of the present invention.

At operation S600, the printer receives a new designated user name from the source user and thereby updates the pre-stored designated user name. For example, the designated user name is changed from the private mode to the public mode or vice versa. If the designated user name is in the private mode, it is possible that the mode is maintained and only the designated user is changed. Preferably, this updating procedure can be performed only by the source user. According to another embodiment, the source user is stored in the print job information storage unit 110 together with the print job such that only the source user is authorized to change the designated user name.

At option S610, the printer 100 reads out contact information corresponding to the updated designated user name from the list stored at operation S500, and notifies the new designated user of the accessibility with respect to the stored print job according to the read contact information. Also, the previous designated user may be notified of the inaccessibility with respect to the stored print job.

According to an exemplary embodiment of the present invention as described above, it is possible to notify of the print job information and thus safely and conveniently share the print job with another user.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A print job information notifying system comprising:
   a printer driver for transmitting a print job and designated user information corresponding to a user designated by a source user of the print job to have access to the print job;
   a print job information storage unit for receiving the print job and the designated user information from the printer driver and storing the print job and the designated user information; and
   a print job management unit for notifying the designated user that the print job is stored according to contact information for the designated user included in the designated user information stored by the print job information storage unit;
   wherein the source user is a user that stores the print job in the system and allows another user to access the stored print job;
   wherein the source user is not a designated user; and
   wherein the designated user is a user designated by the source user for accessing the stored print job.

2. The print job information notifying system as claimed in claim 1, further comprising an account information storage unit for storing a list that contains user names of the system and contact information corresponding to user names,
   wherein, if the designated user information includes a designated user name, the print job management unit reads out contact information corresponding to the designated user name from the stored list, and notifies the designated user that the print job is stored according to the read contact information.

3. The print job information notifying system as claimed in claim 1, further comprising an account information storing unit for storing a list that contains user names of the system and contact information corresponding to the user names,
   wherein the printer driver reads out contact information corresponding to a designated user name from the stored list, adds the read contact information to the designated user information and transmits the designated user information.

4. The print job information notifying system as claimed in claim 2, wherein the designated user name is in at least one of a public mode and a private mode, wherein the public mode is for designating all of the users, and the private mode is for designating at least one of the users.

5. The print job information notifying system as claimed in claim 4, wherein the print job is encrypted, the print job information storage unit receives a password from the printer driver, and the print job management unit transmits the received password to the designated user according to the contact information if the designated user name is in the private mode.

6. The print job information notifying system as claimed in claim 2, wherein the print job information storage unit receives a new designated user name from the printer driver and thereby updates the pre-stored designated user name, and the print job management unit reads out contact information corresponding to the updated designated user name from the account information storage unit and notifies the updated designated user that the print job is stored according to the read contact information.

7. The print job information notifying system as claimed in claim 1, wherein the contact information comprises at least one of an e-mail address, a network address, and a mobile terminal number.

8. The print job information notifying system as claimed in claim 7, wherein the print job management unit notifies the designated user that the print job is stored via at least one of an e-mail, a short message service (SMS), a messenger and a monitor of the designated user having the network address.

9. A print job information notifying printer comprising:
a print job information storage unit for receiving a print job and a designated user name from a source user, the designated user name corresponding to a user designated by the source user to have access to the print job, and for storing the print job and the designated user name;
an account information storage unit for storing a plurality of user names and contact information corresponding to the plurality of user names; and
a print job management unit for reading out contact information corresponding to the designated user name from the account information storage unit and for notifying the designated user that the print job is stored according to the read contact information;
wherein the source user is a user that stores the print job in the printer and allows another user to access the stored print job;
wherein the source user is not a designated user; and
wherein the designated user is a user designated by the source user for accessing the stored print job.

10. The print job information notifying printer as claimed in claim 9, wherein the designated user name is in at least one of a public mode and a private mode, wherein the public mode is for designating all of the users and the private mode is for designating at last one of the users.

11. The print job information notifying printer as claimed in claim 10, wherein the print job is encrypted by the source user, the print job information storage unit receives a password from the source user, and the print job management unit transmits the received password to the designated user according to the contact information when the designated user name is in the private mode.

12. The print job information notifying printer as claimed in claim 9, wherein the print job information storage unit receives a new designated user name from the source user and thereby updates the pre-stored designated user name, and the print job management unit reads out contact information corresponding to the updated designated user from the account information storage unit and notifies the updated designated user that the print job is stored according to the read contact information.

13. The print job information notifying printer as claimed in claim 9, wherein the contact information comprises at least one of an e-mail address, a network address, and a mobile terminal number.

14. The print job information notifying printer as claimed in claim 13, wherein the print job management unit notifies the designated user that the print job is stored via at least one of an e-mail, a SMS, a messenger, and a monitor of the designated user having the network address.

15. A method for notifying print job information, the method comprising:
receiving a print job from a printer driver and designated user information from a source user and storing the print job and the designated user information, the designated user information corresponding to a user designated by the source user to have access to the print job; and
notifying the designated user that the print job is stored according to contact information for the designated user included in the designated user information;
wherein the source user is a user that stores the print job in the printer and allows another user to access the stored print job;
wherein the source user is not a designated user; and
wherein the designated user is a user designated by the source user for accessing the stored print job.

16. The method as claimed in claim 15, further comprising:
storing a list that contains user names of the printer and contact information corresponding to the user names; and
reading out contact information corresponding to the designated user name from the stored list and notifying the designated user that the print job is stored according to the read contact information if the designated user information includes a designated user name.

17. The method as claimed in claim 16, wherein the designated user name is in at least one of a public mode and a private mode, wherein the public mode is for designating all of the users and the private mode is for designating at least one of the users.

18. The method as claimed in claim 17, wherein if the designated user name is in the private mode, the print job is encrypted, the printer receives a password and transmits the received password to the designated user according to the account information.

19. The method as claimed in claim 18, further comprising:
receiving a new designated user name from the source user and thereby updating the pre-stored designated user name; and
reading out contact information corresponding to the updated designated user name from the list and notifying the updated designated user that the print job is stored according to the read contact information.

20. The method as claimed in claim 15, wherein the contact information comprises at least one of an e-mail address, a network address, and a mobile terminal number, and the notifying step notifies the designated user that the print job is stored via at least one of an email, a SMS, a messenger and a monitor of the designated user having a network address.

* * * * *